(12) United States Patent
Ashizawa et al.

(10) Patent No.: US 7,406,942 B2
(45) Date of Patent: Aug. 5, 2008

(54) DIRECT-INJECTION INTERNAL COMBUSTION ENGINE AND METHOD OF CONTROLLING THE DIRECT-INJECTION INTERNAL COMBUSTION ENGINE

(75) Inventors: Takeshi Ashizawa, Yokohama (JP); Hiroshi Nomura, Gotenba (JP); Osamu Tomino, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 23 days.

(21) Appl. No.: 11/504,616

(22) Filed: Aug. 16, 2006

(65) Prior Publication Data

US 2007/0062470 A1 Mar. 22, 2007

(30) Foreign Application Priority Data

Sep. 21, 2005 (JP) ............................. 2005-274164

(51) Int. Cl.
*F02B 3/02* (2006.01)
*F02D 43/04* (2006.01)
*F02P 5/15* (2006.01)
*F01L 1/34* (2006.01)

(52) U.S. Cl. ................ 123/295; 123/90.15; 123/406.53; 123/491

(58) Field of Classification Search .............. 123/90.11, 123/90.15–90.17, 179.16, 295, 305, 491, 123/406.47, 406.53; 60/284, 285
See application file for complete search history.

(56) References Cited

U.S. PATENT DOCUMENTS 5,850,811 A * 12/1998 Tomisawa et al. ......... 123/90.15
6,637,386 B2 * 10/2003 Murata et al. ............ 123/90.15
6,691,506 B2 2/2004 Shimizu

FOREIGN PATENT DOCUMENTS

JP 2004-340040 12/2004

* cited by examiner

*Primary Examiner*—T. M Argenbright
(74) *Attorney, Agent, or Firm*—Oblon, Spivak, McClelland, Maier & Neustadt, P.C.

(57) ABSTRACT

A direct-injection internal combustion engine includes a variable-exhaust-valve control device for controlling value timing of a variable exhaust valve through which the combustion chamber of an engine cylinder communicates with an exhaust path. The variable-exhaust-value control device retards the opening timing of the variable exhaust value to a retard side when the fuel is injected during a compression stroke or an expansion stroke while the direct-injection internal combustion engine is operating in a cold-start state.

16 Claims, 7 Drawing Sheets

DIRECT-INJECTION INTERNAL COMBUSTION ENGINE AND METHOD OF CONTROLLING THE DIRECT-INJECTION INTERNAL COMBUSTION ENGINE

INCORPORATION BY REFERENCE

The disclosure of Japanese Patent Application No. 2005-274164 filed on Sep. 21, 2005 including the specification, drawings and abstract is incorporated herein by reference in its entirety.

BACKGROUND OF THE INVENTION

1. Field of the Invention

The present invention relates to a direct-injection internal combustion engine and a method of controlling the direct-injection internal combustion engine. More specifically, the present invention relates to a direct-injection internal combustion engine and a method of controlling the direct-injection internal combustion engine that inject the fuel via a fuel injection valve during a compression stroke or an expansion stroke while the engine is operating in a cold-start state.

2. Description of the Related Art

In recent years, direct-injection internal combustion engines are currently available, in which fuel is directly injected into the combustion chambers of a plurality of cylinders via fuel injection valves. In the direct-injection internal combustion engine, the combustion mode changes from a stratified-charge combustion to a homogeneous-charge combustion, according to the state in which the internal combustion engine is operating. The stratified-charge combustion is performed mainly during light load and low speed operation, such as when the engine is just started. When stratified-charge combustion is performed, fuel is injected into the combustion chamber via the fuel injection valve during at least one of the compression stroke and the expansion stroke. With regard to a wall-guided direct-injection internal combustion engine, fuel injected while the stratified-charge combustion is performed goes toward an ignition plug, running along a wall surface of the cylinder or the piston crown portion. When going toward the ignition plug, the fuel mixes with the intake air already introduced from the air intake path into the combustion chamber. The air-fuel mixture is ignited by the ignition of the ignition plug, which results in the combustion of the fuel in the mixture.

With regard to the wall-guided direct-injection internal combustion engine, because the temperature in the combustion chamber (i.e., the in-cylinder temperature) is low when the engine is just started, particularly in a cold-start state, part of the fuel injected during the stratified-charge combustion adheres the wall surface of the cylinder or the piston crown portion in a liquid state. Because the adhered fuel is in a liquid state, it is difficult to vaporize. Accordingly, even when the mixture is ignited, and the fuel is burned, most of the adhered fuel is not vaporized, and remains adhered in a liquid state. For this reason, there is a possibility that a large amount of smoke occurs in the combustion chamber.

As described in Japanese Patent Application Publication No. JP-A-2004-340040, a direct-injection internal combustion engine has been proposed that generates a vertical vortex (tumble flow), and maintains the vertical vortex until a later period of the compression stroke. The described engine also includes a fuel injection valve that has a penetration on the ignition plug side longer than the penetration on the piston side. The direct-injection internal combustion engine as described in Japanese Patent Application Publication No. JP-A-2004-340040 can reduce the smoke that occurs in the combustion chamber mainly by keeping the fuel from adhering the piston crown portion.

On the other hand, spray-guided direct-injection internal combustion engines have been proposed. In a spray-guided direct-injection internal combustion engine, the fuel injected during the stratified-charge combustion is mixed with the intake air introduced from the air intake path into the combustion chamber to form a mixture near the ignition plug. Thereafter, the mixture is ignited by the ignition of the ignition plug, which results in the combustion of the fuel in the mixture. In the case of the spray-guided direct-injection internal combustion engine, the fuel injected into the combustion chamber via the fuel injection valve is not directed to the ignition plug by causing the fuel to run along the wall surface of the cylinder or the piston crown portion. Instead, the fuel is directed to the ignition plug by the flow of the intake air in the combustion chamber. Thus, a spray-guided direct-injection internal combustion engine further reduces the smoke that occurs in the combustion chamber by greatly inhibiting the fuel from adhering the wall surface of the cylinder or the piston crown portion.

In a cold-start state, fuel is difficult to vaporize because the temperature in the combustion chamber is low. Especially in a case where the stratified-charge combustion is performed, because the air-fuel mixture is generally rich. The air-fuel mixture near the ignition plug, may include an over-rich region is generated locally in the combustion chamber. In the over-rich region, liquid fuel, or droplet fuel, is suspended. Accordingly, also in the case of the spray-guided direct-injection internal combustion engine, there is a possibility that, smoke occurs in the local over-rich region in the combustion chamber, although the amount thereof is less than that of the wall-guided direct-injection internal combustion engine.

SUMMARY OF THE INVENTION

The present invention provides a direct-injection internal combustion engine and a method of controlling the direct-injection internal combustion engine that inhibit the occurrence of smoke in a combustion chamber.

A first aspect of the present invention is a direct-injection internal combustion engine, in which fuel injected into a combustion chamber during a compression stroke or an expansion stroke is mixed with intake air introduced into the combustion chamber to form an air-fuel mixture near an ignition plug. The direct-injection internal combustion engine includes a variable exhaust valve control device that controls the valve timing of a variable exhaust valve. The variable-exhaust-valve control device retards the opening timing of the variable exhaust valve when the fuel is injected via the fuel injection valve during the compression stroke or the expansion stroke while the direct-injection internal combustion engine is operating in a cold-start state.

According to the first aspect, while the direct-injection internal combustion engine is operating in a cold-start state and the fuel is injected via the fuel injection valve during the compression stroke or the expansion stroke, the opening timing of the variable exhaust valve is retarded to delay the time when the combustion chamber comes to communicate with the exhaust path. If the combustion chamber is closed, the unvaporized fuel suspended in the combustion chamber is vaporized and continues to burn. Accordingly, by elongating the time during which the combustion chamber is closed, it is possible to elongate the time during which the unvaporized fuel is vaporized and burned. In this way, it is possible to inhibit the occurrence of smoke in the combustion chamber.

A second aspect of the present invention is a direct-injection internal combustion engine according to the first aspect, that further includes a coolant-temperature sensor that detects the temperature of coolant circulating in the direct-injection internal combustion engine, wherein the variable-exhaust-valve control device controls a retard amount of the opening timing of the variable exhaust valve according to the detected coolant temperature.

A third aspect of the present invention is a direct-injection internal combustion engine according to the second aspect, in which the variable-exhaust-valve control device increases the retard amount of the opening timing of the variable exhaust valve in proportion to the decrease in the detected coolant temperature.

According to the second and third aspects, the time during which the combustion chamber is closed is controlled according to the temperature of the coolant that occurs in a cold-start state. When the coolant temperature is low, the in-cylinder temperature is correspondingly low. If the in-cylinder temperature is low, the fuel is difficult to burn in the combustion chamber. As a result, such a situation arises that a large quantity of unvaporized fuel is suspended in the combustion chamber. In consideration of this, for example, the retard amount of the opening timing of the exhaust valve is increased in proportion to the decrease in the coolant temperature, whereby it is possible to elongate the time during which the combustion chamber is closed. In this way, it is possible to vaporize the unvaporized fuel suspended in the combustion chamber and burn the fuel. Thus, it is possible to inhibit the occurrence of smoke in the combustion chamber.

A fourth aspect of the present invention is a direct-injection internal combustion engine according to the first aspect, that further includes a vaporization-degree prediction device to predict the degree of vaporization of the fuel injected via the fuel injection valve. In this aspect of the invention, the variable-exhaust-valve control device controls the retard amount of the opening timing of the variable exhaust valve according to the predicted vaporization degree.

A fifth aspect of the present invention is similar to the fourth aspect, except that the variable-exhaust-valve control device increases the retard amount of the opening timing of the variable exhaust valve in proportion to the decrease in the predicted vaporization degree.

A sixth aspect of the present invention is a direct-injection internal combustion engine according to the fourth aspect, in which the vaporization-degree prediction device predicts the vaporization degree of the fuel, based on at least one of the temperature of the combustion chamber, the temperature of the fuel to be injected, and the droplet diameter of the fuel injected via the fuel injection valve.

According to the fourth through the sixth aspects, the time during which the combustion chamber is closed is controlled according to the vaporization degree of the fuel injected during a cold-start state. While the engine is operating in a cold-start state, the smaller the degree of vaporization of the fuel, the more over-rich the local air-fuel ratio of the mixture in the combustion chamber will be. And it becomes difficult for the fuel suspended in the combustion chamber to vaporize. In short, if the vaporization degree of the fuel is small, a situation arises where the unvaporized fuel is suspended in the combustion chamber. In consideration of this, for example, the retard amount of the opening timing of the exhaust valve is increased in proportion to the decrease in the vaporization degree, whereby the combustion chamber remains closed for a longer time. In this way, it is possible to vaporize the unvaporized fuel that is suspended in the combustion chamber and then burn the fuel after it has vaporized. Thus, it is possible to inhibit the occurrence of smoke in the combustion chamber.

A seventh aspect of the present invention is a direct-injection internal combustion engine according to the first aspect, that further includes an ignition-timing control device that retards the ignition timing of the ignition plug when the fuel is injected during the compression stroke, or the expansion stroke, while the direct-injection internal combustion engine is operating in a cold-start state.

When the engine is operating in a cold-start state, the temperature of the purification catalyst of the exhaust-gas purification device is not at the activation temperature of the purification catalyst. As such, it is preferable to increase the temperature of the exhaust gas that is introduced into the exhaust-gas purification device. Accordingly, when the engine is operating in a cold-start state, the ignition timing of the ignition plugs is retarded to delay the ignition timing, so that the temperature of the exhaust gas that is discharged into the exhaust path is increased. However, when the ignition timing of the ignition plugs is delayed, the time during which the fuel in the mixture is burned becomes short. In this case, much of the unvaporized fuel suspended in the combustion chamber cannot be vaporized, and, therefore, the combustion is not continued. As a result, much smoke can occur in the combustion chamber. According to the seventh aspect, while the direct-injection internal combustion engine is operating in a cold-start state, when the fuel is injected during the compression stroke or the expansion stroke, both the ignition timing of the ignition plug and the opening timing of the variable exhaust valve are retarded. In this way, it is possible to quickly increase the temperature of the purification catalyst of the exhaust-gas purification device. In addition, it is possible to inhibit the occurrence of smoke in the combustion chamber.

A eighth aspect of the present invention is a method of controlling a direct-injection internal combustion engine, in which fuel injected into a combustion chamber during a compression stroke or an expansion stroke is mixed with intake air introduced into the combustion chamber to form an air-fuel mixture near an ignition plug, the method including: controlling valve timing of a variable exhaust valve through which the combustion chamber of an engine cylinder communicates with an exhaust path, wherein an opening timing of the variable exhaust valve is retarded when the fuel is injected during the compression stroke or the expansion stroke while the direct-injection internal combustion engine is operating in a cold-start state.

The direct-injection internal combustion engine according to the present invention elongates the time during which the combustion chamber is closed, and, as a result, can vaporize and burn the unvaporized fuel suspended in the combustion chamber. Thus, it is possible to inhibit the occurrence of smoke in the combustion chamber.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

The present invention will be described in detail with reference to the drawings. The present invention is not limited to embodiments described below. The embodiments include such elements that can be easily imagined by those skilled in the art, and/or ones that are substantially the same as such elements.

Figure 1:
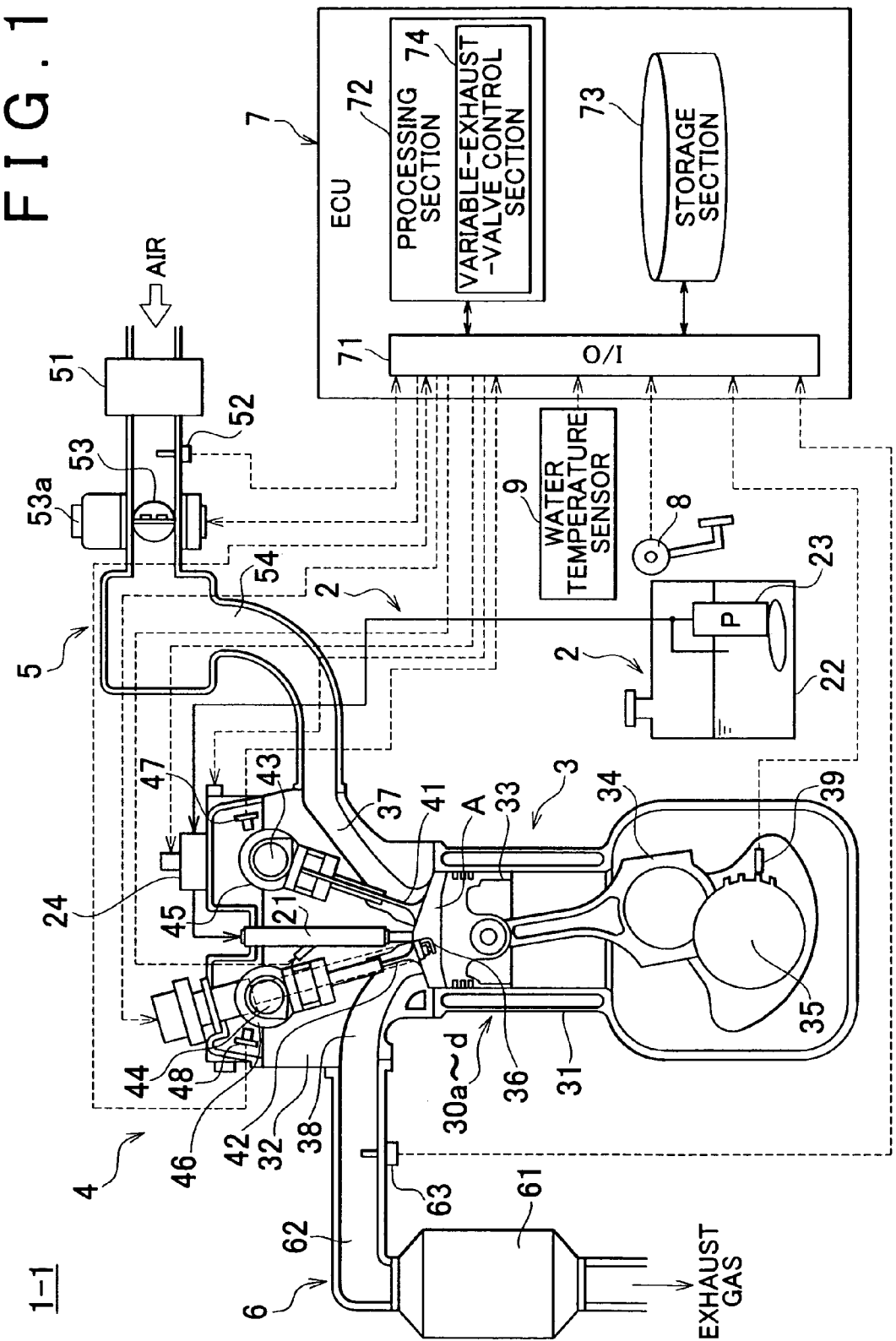
FIG. 1 is a diagram showing a configuration example of a spray-guided direct-injection internal combustion engine of a first embodiment.
Figure 2A:
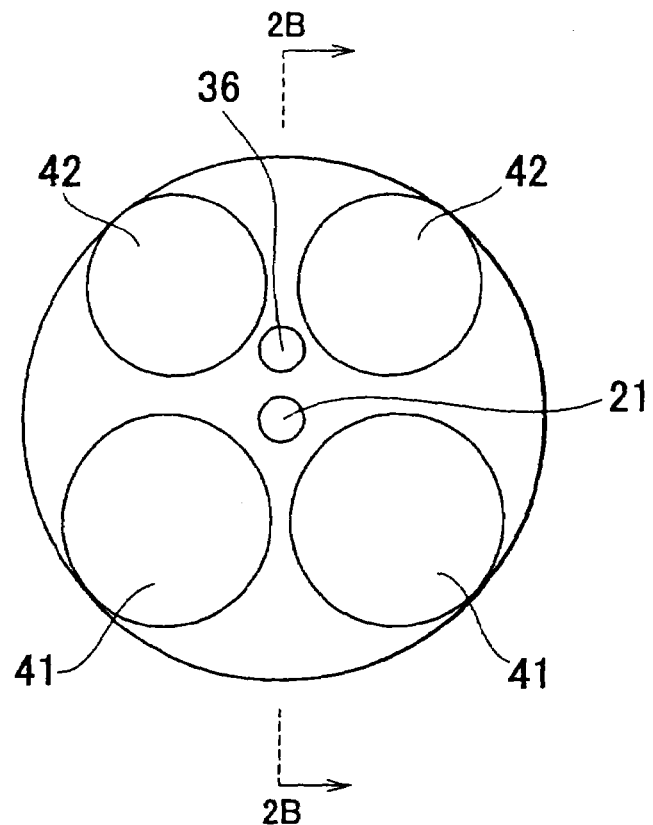
FIG. 2A is a diagram showing an arrangement of a fuel injection valve and an ignition plug in relation to a combustion chamber.
Figure 2B:
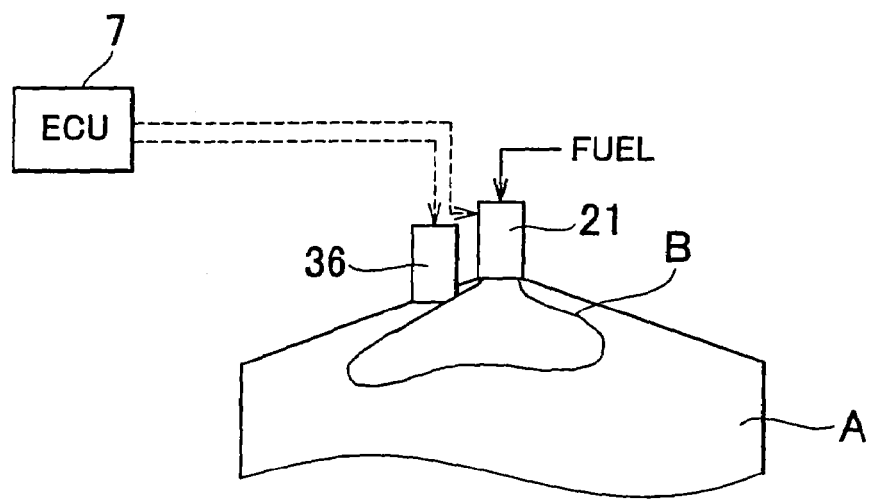
FIG. 2B is a diagram showing a sectional view taken along the line 2B-2B of FIG. 2A.

FIG. 1 is a diagram showing a configuration example of a spray-guided direct-injection internal combustion engine according to the first embodiment. FIG. 2A is a diagram showing an arrangement of the fuel injection valve and the ignition plug in relation to the combustion chamber. FIG. 2B shows a sectional view taken along the line 2B-2B of FIG. 2A. As shown in FIG. 1, the direct-injection internal combustion engine 1-1 includes: fuel supply equipment 2; an internal combustion engine body 3, constituted of a plurality of cylinders (in-line four cylinders, in the first embodiment); an air intake path 5 connected to the internal combustion engine body 3; an exhaust path 6, connected to the internal combustion engine body 3; and an ECU (Electronic Control Unit) 7, which is an operation controller that controls the operation of the direct-injection internal combustion engine 1-1.

The fuel supply equipment 2 is used to supply fuel, for example, gasoline, stored in a fuel tank 22, to the direct-injection internal combustion engine 1-1. The fuel supply equipment 2 includes: the fuel injection valves 21, the fuel tank 22, a low-pressure fuel pump 23; a high-pressure fuel pump 24; and fuel supply piping (not shown).

Each of the cylinders 30a to 30d of the internal combustion engine body 3 is provided with a fuel injection valve 21. The fuel injection valves 21 inject the fuel, which is pressurized by the low-pressure fuel pump 23 and the high-pressure fuel pump 24, to the respective combustion chambers A of the cylinders 30a to 30d. The fuel injection valve 21 is disposed near the ignition plug 36 (to be is described later) to make it possible to guide the spray, as shown in FIGS. 2A and 2B. The injection direction of the fuel of the fuel injection valve 21 is set so that, during the stratified-charge combustion, that is, when the fuel is injected into a combustion chamber A via the fuel injection valve 21 during at least one of the compression stroke and the expansion stroke, the fuel B injected into the combustion chamber A is mixed with the intake air already introduced from the air intake path 5 to the combustion chamber A via a pair of variable intake valves 41 (to be described later) to form an air-fuel mixture near the ignition plug 36.

The ECU 7 controls the fuel injection amount and the injection timing of the fuel injection valve 21, that is, the fuel injection control.

The high-pressure fuel pump 24 further increases the pressure of the fuel supplied from the fuel tank 22 of which pressure increased by the low-pressure fuel pump 23. The rotation of a pump-driving cam (not shown) attached to an intake camshaft 43 of a variable valve system 4, for example, drives the high-pressure fuel pump 24. The intake camshaft 43 rotates with the rotation of a crankshaft 35. Accordingly, the high-pressure fuel pump 24 is driven by the output of the internal combustion engine 1-1.

The high-pressure fuel pump 24 is provided with a solenoid spill valve (not shown). The solenoid spill valve regulates the amount of fuel that flows into the high-pressure fuel pump 24, the pressure of which has been increased by the low-pressure fuel pump 23. The ECU 7 controls the amount of fuel that flows into the high-pressure fuel pump 24, that is, the inflow control, via the solenoid spill valve (not shown).

The internal combustion engine body 3 includes: a cylinder block 31; a cylinder head 32 fixed to the cylinder block 31; a piston 33 and a connecting rod 34 that are provided for each of the cylinders 30a to 30d; the crankshaft 35; an ignition plug 36, which is provided for each of the cylinders 30a to 30d; and the variable valve system 4. In each of the cylinders 30a to 30d of the internal combustion engine body 3, the combustion chamber A is formed by the piston 33 of each of the cylinders 30a to 30d, the cylinder block 31, and the cylinder head 32. In the cylinder head 32, an air inlet port 37 and an exhaust port 38 are formed for each of the cylinders 30a to 30d, and are connected to the air intake path 5 and the exhaust path 6, respectively. The piston 33 is freely rotatably coupled to the connecting rod 34, and the connecting rod 34 is freely rotatably coupled to the crankshaft 35. Accordingly, when the air-fuel mixture is burned in the combustion chamber A, the piston 33 reciprocates in the cylinder block 31, which causes the crankshaft 35 to rotate.

The ignition plug 36 is provided for each of the cylinders 30a to 30d. The ignition plugs 36 fire in accordance with the ignition signals from the ECU 7 to ignite the mixture in the combustion chambers A of the cylinders 30a to 30d. The ignition plug 36 is disposed near the fuel injection valve 21 as described above so as to make it possible to guide the spray, as shown in FIGS. 2A and 2B. The ECU 7 controls the ignition timing of the ignition plugs 36, that is, the ignition control.

The crankshaft 35 is provided with a crank angle sensor 39, which detects the crank angle (CA), the rotation angle of the crankshaft 35, and outputs the angle to the ECU 7. The ECU 7 determines the number of revolutions of the internal combustion engine 1-1, and identifies each of the cylinders 30a to 30d, based on the crank angle detected by the crank angle sensor 39.

The variable valve system 4 causes the variable intake valves 41 and variable exhaust valves 42 to open and close. The variable valve system 4 includes: a pair of the variable intake valves 41 and a pair of the variable exhaust valves 42 that are provided for each of the cylinders 30a to 30d; the intake camshaft 43; an exhaust camshaft 44; a variable-intake-valve timing mechanism 45; and a variable-exhaust-valve timing mechanism 46. The variable intake valves 41 are disposed between the air inlet port 37 and the combustion chambers A, and are opened and closed due to the rotation of the intake camshaft 43. The variable exhaust valves 42 are disposed between the exhaust port 38 and the combustion chambers A, and are opened and closed due to the rotation of the exhaust camshaft 44. The intake camshaft 43 and the exhaust camshaft 44 are coupled to the crankshaft 35 via a timing chain, and rotate with the rotation of the crankshaft 35.

The variable-intake-valve timing mechanism 45 is disposed between the intake camshaft 43 and the crankshaft 35. The variable-exhaust-valve timing mechanism 46 is disposed between the exhaust camshaft 44 and the crankshaft 35. The variable-intake-valve timing mechanism 45 and the variable-exhaust-valve timing mechanism 46 are continuously variable valve timing mechanisms, which continuously vary the phases of the intake camshaft 43 and the exhaust camshaft 44, respectively.

An advance chamber and a retard chamber (not shown) are formed in the variable-intake-valve timing mechanism 45 and the variable-exhaust-valve timing mechanism 46, respectively. Oil is supplied from an oil control valve (not shown) of the variable valve system 4 to one of the advance chamber and the retard chamber. The phases of the intake camshaft 43 and the exhaust camshaft 44 are advanced when the oil is supplied to the advance chamber, or retarded when the oil is supplied to the retard chamber. The variable valve system 4 adjusts the valve timing of the variable intake valves 41 and the variable exhaust valves 42 by changing the phase of the intake camshaft 43 and the exhaust camshaft 44. Specifically, the variable valve system 4 advances or retards the valve timing of the variable intake valves 41 and the variable exhaust valves 42. More specifically, the variable valve system 4 controls the advance amount or the retard amount of the valve timing of the variable intake valves 41 and the variable exhaust valves 42.

Two oil control valves (not shown) each assigned to the variable-intake-valve timing mechanism 45 and the variable-exhaust-valve timing mechanism 46 supply oil to one of the advance chamber and the retard chamber of each of the variable-intake-valve timing mechanism 45 and the variable-exhaust-valve timing mechanism 46 by shifting the position of a spool valve provided in the oil control valve. The control of the positions of the two spool valves, that is, the control of the valve timing of the variable intake valves 41 and the control of the valve timing of the variable exhaust valves 42, are performed by the ECU 7 described later. The variable valve system 4 is provided with an intake-cam position sensor 47 and an exhaust-cam position sensor 48, which detect the rotational positions of the intake camshaft 43 and the exhaust camshaft 44, respectively, and output the positions to the ECU 7. The variable valve system 4 adjusts the valve timing of both of the variable intake valves 41 and the variable exhaust valves 42 by using the variable-intake-valve timing mechanism 45 and the variable-exhaust-valve timing mechanism 46, respectively. However, the variable valve system 4 is not limited to the embodiment described above. For example, the variable valve system 4 may be provided with the variable-exhaust-valve timing mechanism 46 only. In this case, the variable valve system 4 adjusts the valve timing of the variable exhaust valves 42 only.

The air intake path 5 is used to take in air from the outside, and introduce the air into the combustion chambers A of the cylinders 30a to 30d of the internal combustion engine body 3. The air intake path 5 includes an air cleaner 51, an air flow meter 52, a throttle valve 53, and an air intake passage 54, which connects the air cleaner 51 to the air inlet port 37 of each of the cylinders 30a to 30d. The air cleaner 51 removes dust particles from air that is introduced into the combustion chamber A of each of the cylinders 30a to 30d through the air intake passage 54 and the air inlet port 37. The air flow meter 52 detects the amount of air introduced into each of the cylinders 30a to 30d, that is, the amount of intake air, and outputs the amount to the ECU 7. The an actuator 53a, such as a stepping motor, drives throttle valve 53. The throttle valve 53 regulates the amount of intake air to be introduced to the combustion chamber A of each of the cylinders 30a to 30d. The ECU 7 performs the throttle-valve opening degree control, that is, the control of the opening degree of the throttle valve 53, which is described later.

The exhaust path 6 is constituted of an exhaust-gas purification device 61, a muffler (not shown), and an exhaust passage 62, which connects the exhaust port 38 of each of the cylinders 30a to 30d to the muffler through the exhaust-gas purification device 61. The exhaust-gas purification device 61 removes harmful substances contained in the exhaust gas introduced via the exhaust passage 62. The exhaust gas purified by removing the harmful substances is discharged into the atmosphere via the muffler (not shown). The exhaust passage 62 located upstream of the exhaust-gas purification device 61 is provided with an A/F sensor 63, which detects the air-fuel ratio of the exhaust gas to be discharged into the exhaust passage 62, and outputs the air-fuel ratio to the ECU 7. The means for detecting the air-fuel ratio of the exhaust gas is not limited to the A/F sensor 63. For example, an $O_2$ sensor, which detects the oxygen content of the exhaust gas to be discharged into the exhaust passage 62, may be used.

The ECU 7 controls the operation of the direct-injection internal combustion engine 1-1. Various input signals are supplied, to the ECU 7, from the sensors, which are attached to various portions of a vehicle on which the direct-injection internal combustion engine is mounted. Specifically, the various input signals are, for example, the signal of the crank angle detected by the crank angle sensor 39 with which the crankshaft 35 is provided, signals of the rotational positions of the intake camshaft and the exhaust camshaft detected by the intake-cam position sensor 47 and the exhaust-cam position sensor 48, respectively, the signal of the amount of intake air detected by the air flowmeter 52, the signal of the accelerator-pedal operation amount detected by an accelerator-pedal sensor 8, the signal of the air-fuel ratio detected by the A/F sensor 63, and the signal of the temperature T of the coolant circulating in the direct-injection internal combustion engine 1-1, which is detected by a water temperature sensor 9 attached in the coolant passage.

The ECU 7 outputs various output signals, based on these input signals and various maps stored in a storage section 73. Specifically, the various output signals are, for example, an injection signal for performing the fuel injection control of the fuel injection valves 21, a high-pressure-fuel-pump control signal for performing the control of the amount of fuel that flows into the high-pressure fuel pump 24, an ignition signal for performing the ignition control of the ignition plugs 36, a signal of the advance/retard amount of the variable intake valves for performing the control of the variable intake valves 41, a signal of the advance/retard amount of the variable exhaust valves for performing the control of the variable exhaust valves 42, and a throttle-valve opening degree signal for performing the control of the opening degree of the throttle valves 53.

The ECU 7 includes: an input/output section (I/O) 71 that inputs and outputs the input signals and the output signals; a processing section 72, and the storage section 73 that stores various maps, such as a fuel injection amount map, a variable-exhaust-valve opening timing map that is made based on the opening timing of the variable exhaust valves 42, and the coolant temperature T. The processing section 72 has at least a variable-exhaust-valve control section 74, which is a variable-exhaust-valve control device. The variable-exhaust-valve control section 74 includes a memory and a CPU (Central Processing Unit). The processing section 72 may implement the operation control and the like of the direct-injection internal combustion engine 1-1 by loading a program, which is made based on the operation control of the direct-injection internal combustion engine 1-1, into the memory, and executing the program. The storage section 73 may be constituted of nonvolatile memory, such as a flash memory, a read-only nonvolatile memory, such as a ROM (Read Only Memory), a readable/writable volatile memory, such as a RAM (Random Access Memory), or a combination of the memory types.

Figure 3:
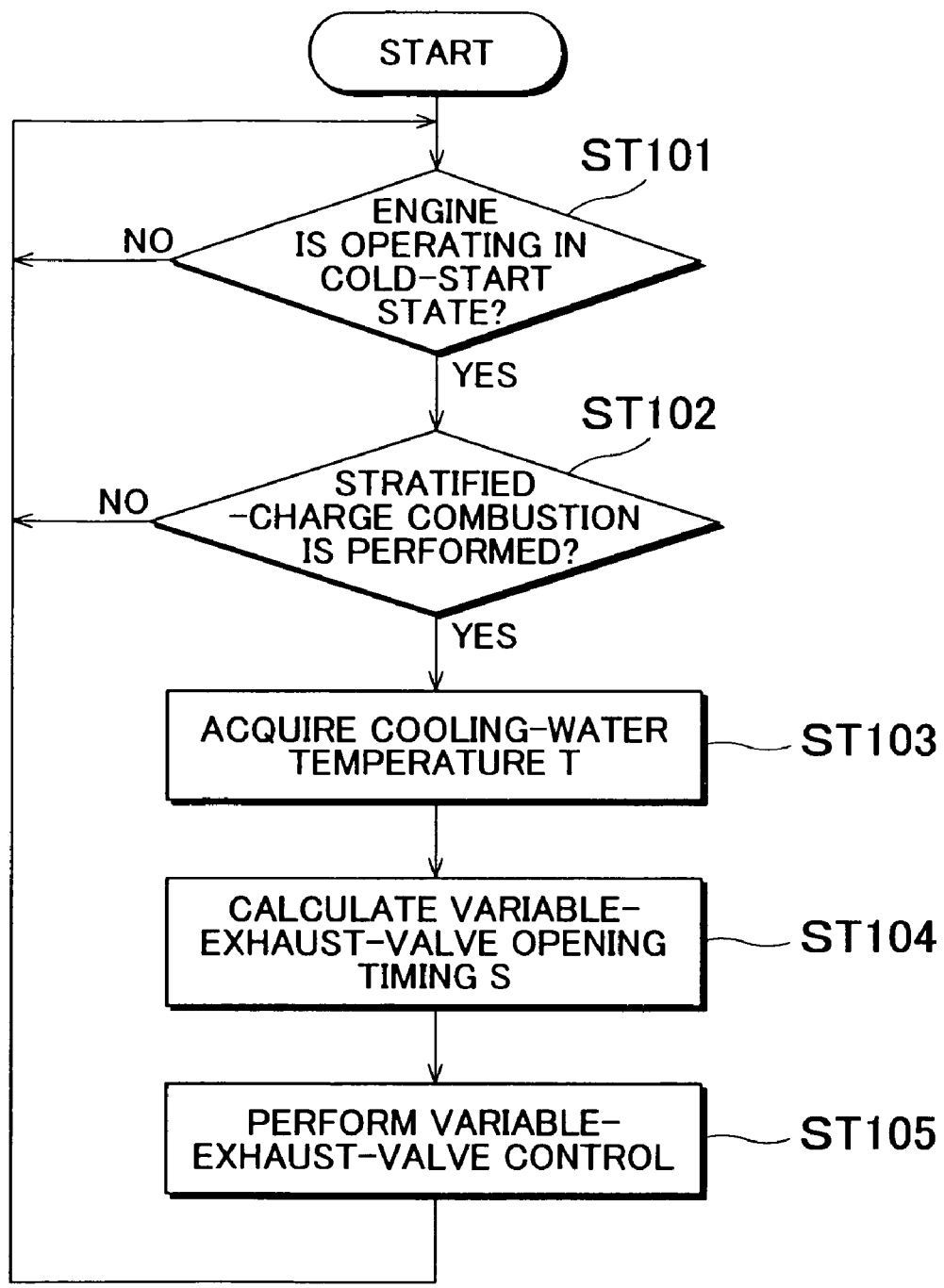
FIG. 3 is a diagram showing an operational flow of the direct-injection internal combustion engine of the first embodiment.
Figure 4:
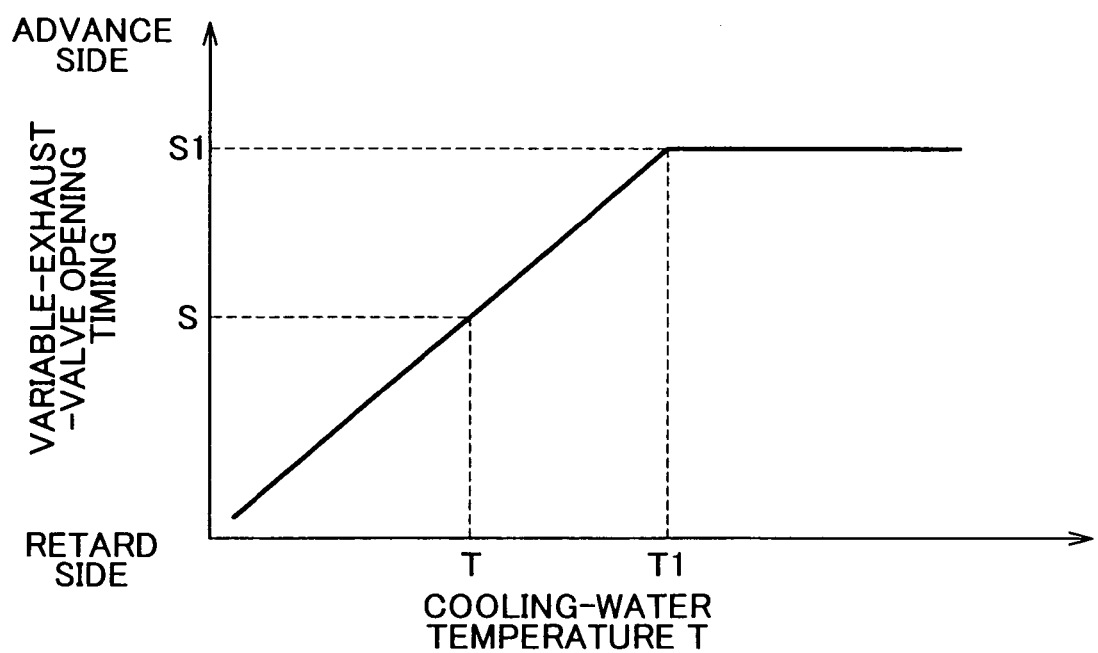
FIG. 4 is a diagram showing a variable-exhaust-valve opening timing map.

Next, the operation of the direct-injection internal combustion engine 1-1 of the first embodiment and a variable-exhaust-valve control performed during the stratified-charge combustion will be described. FIG. 3 shows the operational flow of the direct-injection internal combustion engine of the first embodiment. FIG. 4 is a diagram showing a variable-exhaust-valve opening timing map. As shown in FIG. 3, the processing section 72 of the ECU 7 determines whether the direct-injection internal combustion engine 1-1 is operating in a cold-start state (ST1O1). For example, after an ignition sensor (not shown) detects that the ignition switch is turned on the processing section 72 determines whether the coolant temperature T detected by the coolant temperature sensor 9 is lower than a warm-start coolant temperature. The warm-start coolant temperature means a water temperature that occurs when the temperature of the purification catalyst of the exhaust-gas purification device and the in-cylinder temperature have not dropped to a sufficiently low temperature relative to a temperature that occurs when the direct-injection internal combustion engine is operating because an insufficient time has elapsed from when direct-injection internal combustion engine 1-1 is stopped.

Subsequently, if it is determined that the direct-injection internal combustion engine 1-1 is operating in a cold-start state, the processing section 72 of the ECU 7 determines whether the stratified-charge combustion is occurring (ST102). Specifically, the processing section 72 determines whether fuel is being injected into the combustion chamber A of each of the cylinders 30a to 30d during at least one of a compression stroke and an expansion stroke of the cylinders 30a to 30d.

Subsequently, if it is determined that the direct-injection internal combustion engine 1-1 is operating in a state where the stratified-charge combustion is occurring, the processing section 72 of the ECU 7 acquires the coolant temperature T detected by the coolant temperature sensor 9 (ST103).

Subsequently, the variable-exhaust-valve control section 74 of the processing section 72 calculates variable-exhaust-valve opening timing S from the acquired coolant temperature T, and the variable-exhaust-valve opening timing map that is made based on the variable-exhaust-valve opening timing and the coolant temperature T, which is stored in the storage section 73, and is shown in FIG. 4 (ST104). As shown in FIG. 4, the variable-exhaust-valve opening timing map is set so that, when the coolant temperature T is lower than a predetermined coolant temperature T1, the opening timing of the variable exhaust valve 42 is retarded relative to the normal opening timing S1 that depends on the state in which the direct-injection internal combustion engine 1-1 is operating. In particular, the variable-exhaust-valve opening timing map is set so that the retard amount of the opening timing of the variable exhaust valve 42 increases in proportion to the decrease in the coolant temperature T when the coolant temperature T is lower than the predetermined coolant temperature T1. Accordingly, if the acquired coolant temperature T is at the predetermined coolant temperature T1, the calculated variable-exhaust-valve opening timing S is on the retard side of the normal opening timing S1. The predetermined coolant temperature T1 may be the same temperature as the above-described warm-start coolant temperature, for example. When the coolant temperature T is lower than a predetermined temperature T1, it indicates that the engine is in a cold-start state. For example, the predetermined coolant temperature T1 means a coolant temperature that occurs when the temperature of the purification catalyst of the exhaust-gas purification device and the in-cylinder temperature have not dropped to a sufficiently low temperature relative to a temperature that occurs when the direct-injection internal combustion engine is operating because insufficient time has elapsed after the direct-injection internal combustion engine 1-1 is stopped.

Subsequently, the variable-exhaust-valve control section 74 of the processing section 72 performs variable-exhaust-valve control, which is the control of the valve timing of the variable exhaust valves 42, based on the calculated variable-exhaust-valve opening timing S (ST1O5). For example, the variable-exhaust-valve control section 74 of the processing section 72 retards the opening timing of the variable exhaust valves 42 by supplying oil to the retard chamber of the variable-exhaust-valve timing mechanism 46, based on the retard amount that is the difference between the calculated variable-exhaust-valve opening timing S and the normal opening timing S1. Specifically, when the direct-injection internal combustion engine 1-1 is operating in a cold-start state, and the fuel is injected during the compression stroke or the expansion stroke, the variable-exhaust-valve control section 74 retards the opening timing of the variable exhaust valves 42 to delay the time when the combustion chamber A comes to communicate with the exhaust path 5. When it is determined that the acquired coolant temperature T is equal to or higher than the predetermined water temperature T1, the variable-exhaust-valve control section 74 performs the variable-exhaust-valve control so that the variable-exhaust-valve opening timing S is set to the normal opening timing S1.

If the opening timing of the variable exhaust valves 42 is retarded, the time during which the combustion chamber A is closed is increased. Thus, it is possible to vaporize the unvaporized fuel, and to elongate the time during which the vaporized fuel is burned. In particular, in the first embodiment, when the engine is operating in a cold-start state, the retard amount of the opening timing of the variable exhaust valves 42 is increased in proportion to the decrease in the coolant temperature T. In this way, the time during which the combustion chamber A is closed is controlled according to the temperature of the coolant that occurs in a cold-start state. Thus, while the temperature of the purification catalyst of the exhaust-gas purification device 61 is low, the time during which the combustion chamber A is closed is increased by increasing the retard amount of the opening timing of the variable exhaust valves 42 in proportion to the decrease in the coolant temperature, which decreases as the temperature in the combustion chambers A (i.e. the in-cylinder temperature) decreases. In this way, it is possible to vaporize and burn much of the unvaporized fuel that is suspended in the combustion chambers A. Thus, it is possible to inhibit the occurrence of smoke in the combustion chambers A.

Figure 5:
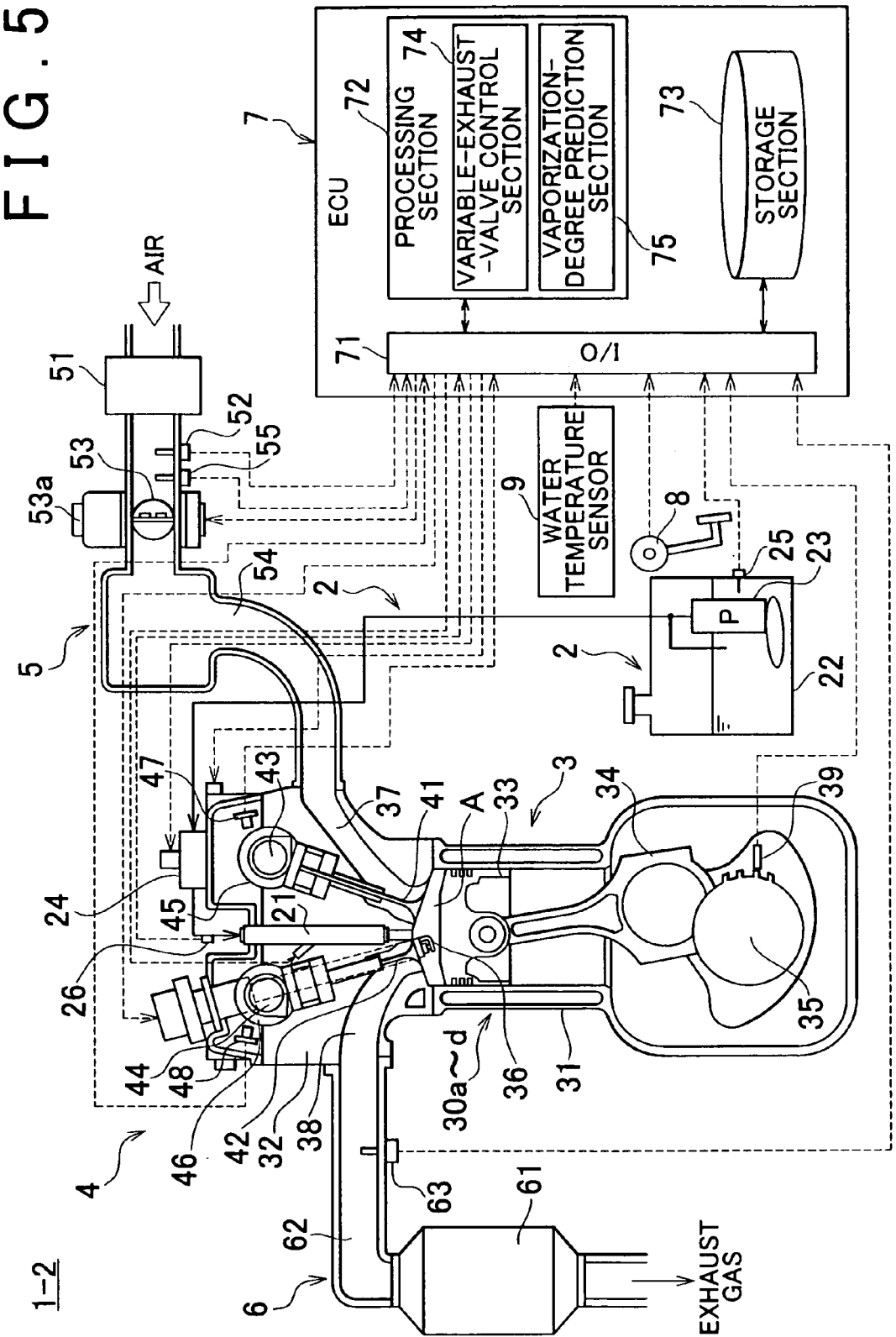
FIG. 5 is a diagram showing a configuration example of a spray-guided direct-injection internal combustion engine of the second embodiment.

A direct-injection internal combustion engine 1-2 of a second embodiment is a spray-guided direct-injection internal combustion engine as in the case of the direct-injection internal combustion engine 1-1 of the first embodiment. FIG. 5 shows an example configuration of the spray-guided direct-injection internal combustion engine of the second embodiment. The direct-injection internal combustion engine 1-2 shown in FIG. 5 differs from the direct-injection internal combustion engine 1-1 in that the retard amount of the opening timing of the variable exhaust valves 42 is controlled according to a vaporization degree EV of the injected fuel, instead of the coolant temperature T. Among basic elements of the direct-injection internal combustion engine 1-2 of the second embodiment, the same elements as those of the basic elements of the direct-injection internal combustion engine 1-1 of the first embodiment (the elements indicated by the same reference numerals in FIGS. 1 and 5) will be briefly described, or description thereof will be omitted.

The vaporization degree EV of the injected fuel depends on the temperature in the combustion chambers A, that is, the in-cylinder temperature, the fuel temperature F of the injected fuel, and the droplet diameter of the injected fuel. Accordingly, in the second embodiment, the vaporization degree EV of the fuel is calculated based on the coolant temperature T, an intake-air temperature I of the intake air introduced into the combustion chambers A, and the fuel temperature F, all of which influence the in-cylinder temperature, as well as the fuel pressure P of the fuel to be injected and a lift amount L of the fuel injection valves 21, which influence the droplet diameter of the fuel.

The fuel supply equipment 2 is provided with a fuel temperature sensor 25 and a fuel pressure sensor 26. The fuel temperature sensor 25, which is attached to the fuel tank 22 in the second embodiment, detects the fuel temperature F of the fuel to be injected, and outputs the temperature to the ECU 7. The fuel pressure sensor 26, which is attached between the high-pressure fuel pump 24 and the fuel injection valves 21 in the second embodiment, detects the fuel pressure P of the fuel to be injected via the fuel injection valves 21, and outputs the pressure to the ECU 7.

The air intake path 5 is provided with an intake-air temperature sensor 55. The intake-air temperature sensor 55, which is attached in the air intake passage 54 of the air intake path 5 in the second embodiment, detects the intake-air temperature I of the intake air introduced from the air intake path 5 into the combustion chambers A through the air inlet port 37, and outputs the temperature to the ECU 7.

The processing section 72 of the ECU 7 has a vaporization-degree prediction section 75, which is a vaporization-degree prediction device for calculating the vaporization degree EV of the fuel based on the intake-air temperature I, the coolant temperature T, the fuel temperature F, the fuel pressure P, and the lift amount L. In the storage section 73 of the ECU 7, a vaporization-degree-coefficient $EV_I$ map that is made based on a vaporization-degree coefficient $EV_I$ and the intake-air temperature I, a vaporization-degree-coefficient $EV_T$ map that is made based on a vaporization-degree coefficient $EV_T$ and the coolant temperature T, a vaporization-degree-coefficient $EV_F$ map that is made based on a vaporization-degree coefficient $EV_F$ and the fuel temperature F, a vaporization-degree-coefficient $EV_P$ map that is made based on a vaporization-degree coefficient $EV_P$ and the fuel pressure P, a vaporization-degree-coefficient $EV_L$ map that is made based on a vaporization-degree coefficient $EV_L$ and the lift amount L, and a variable-exhaust-valve opening timing map that is made based on the opening timing of the variable exhaust valves 42 and the vaporization degree EV, are stored.

Although not shown, the vaporization-degree-coefficient $EV_I$ map is set so that the lower the intake-air temperature I is, the smaller the vaporization-degree coefficient $EV_I$ is. This is because the in-cylinder temperature decreases as the intake-air temperature I decreases, and the drop in the in-cylinder temperature makes it difficult to vaporize the fuel. Although not shown, the vaporization-degree-coefficient $EV_T$ map is set so that the lower the coolant temperature T is, the smaller the vaporization-degree coefficient $EV_T$ is. This is because the in-cylinder temperature decreases as the coolant temperature T decreases, and the drop in the in-cylinder temperature makes it difficult to vaporize the fuel. Although not shown, the vaporization-degree-coefficient $EV_F$ map is set so that the lower the fuel temperature F is, the smaller the vaporization-degree coefficient $EV_F$ is. This is because the drop in the fuel temperature F makes it difficult to vaporize the fuel. Although not shown, the vaporization-degree-coefficient $EV_P$ map is set so that the lower the fuel pressure P is, the smaller the vaporization-degree coefficient $EV_P$ is. This is because the droplet diameter of the fuel increases as the fuel pressure P decreases, and the increase in the droplet diameter of the fuel makes it difficult to vaporize the fuel. Although not shown, the vaporization-degree-coefficient $EV_L$ map is set so that the larger the lift amount L of the fuel injection valves 21 is, the smaller the vaporization-degree coefficient $EV_L$ is. This is because the droplet diameter of the fuel increases as the lift amount L increases, and the increase in the droplet diameter of the fuel makes it difficult to vaporize the fuel. In short, the values of the vaporization-degree coefficients $EV_I$ to $EV_P$ decrease with increasing difficulty in vaporizing the fuel.

Figure 6:
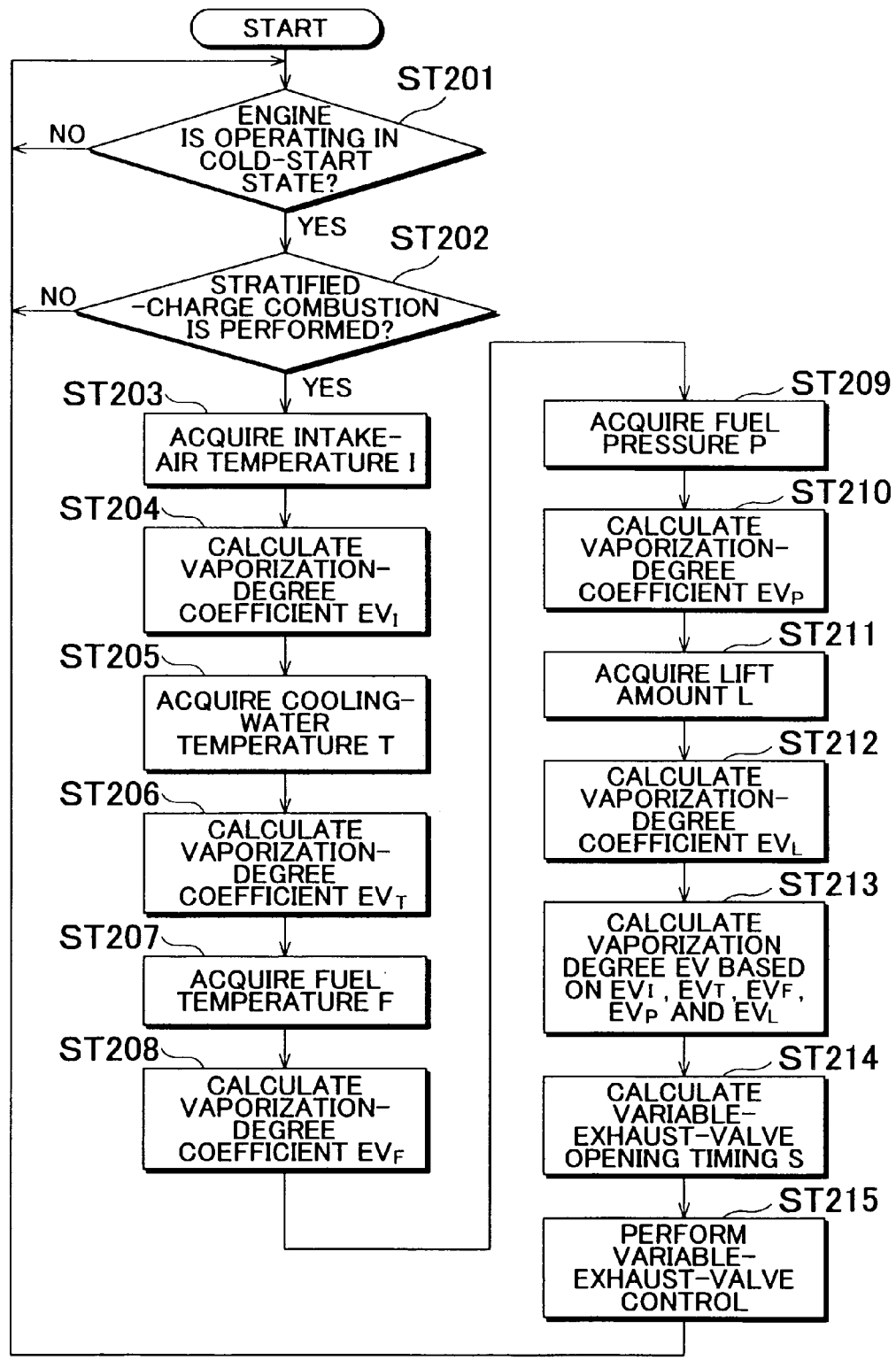
FIG. 6 is a diagram showing an operational flow of the direct-injection internal combustion engine of the second embodiment.
Figure 7:
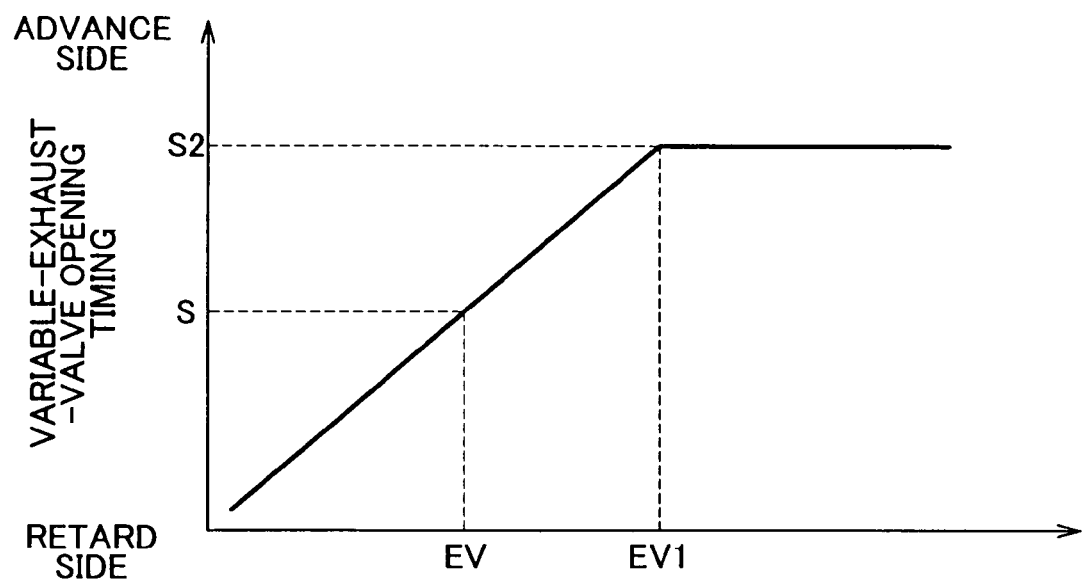
FIG. 7 is a diagram showing a variable-exhaust-valve opening timing map.

Next, an operation of the direct-injection internal combustion engine 1-2 of the second embodiment and a variable-exhaust-valve control performed during the stratified-charge combustion will be described. FIG. 6 shows the operational flow of the direct-injection internal combustion engine of the second embodiment. FIG. 7 shows a variable-exhaust-valve opening timing map. Brief description will be given of the part of the operation of the variable exhaust valves that is shown in FIG. 6 and is performed when the direct-injection internal combustion engine 1-2 is operating in a state where the stratified-charge combustion is occurring, which part is the same as that of the operation of the variable exhaust valves that is shown in FIG. 3 and is performed when the direct-injection internal combustion engine 1-1 is operating in a state where the stratified-charge combustion is occurring.

First, as shown in FIG. 6, the processing section 72 of the ECU 7 determines whether the direct-injection internal combustion engine 1-2 is operating in a cold-start state (ST201). If it is determined that the direct-injection internal combustion engine 1-2 is operating in a cold-start state, the processing section 72 determines whether the stratified-charge combustion is occurring (ST202).

Subsequently, if it is determined that the direct-injection internal combustion engine 1-2 is operating in a state where the stratified-charge combustion is occurring, the vaporization-degree prediction section 75 of the processing section 72 acquires the intake-air temperature I detected by the intake-air temperature sensor 55 (ST203). Then, the vaporization-degree prediction section 75 calculates the vaporization-degree coefficient $EV_I$ from the acquired intake-air temperature I and the vaporization-degree-coefficient $EV_I$ map (ST204).

After calculating the vaporization-degree-coefficient $EV_I$, the vaporization-degree prediction section 75 of the processing section 72 acquires the coolant temperature T detected by the coolant temperature sensor 9 (ST205). Subsequently, the vaporization-degree prediction section 75 calculates the vaporization-degree coefficient $EV_T$ from the acquired coolant temperature T and the vaporization-degree-coefficient $EV_T$ map (ST206).

After calculating the vaporization-degree-coefficient $EV_T$, the vaporization-degree prediction section 75 of the processing section 72 acquires the fuel temperature F of the fuel injected via the fuel injection valves 21, that is detected by the fuel temperature sensor 25 (ST207). Subsequently, the vaporization-degree prediction section 75 calculates the vaporization-degree coefficient $EV_F$ from the acquired fuel temperature F and the vaporization-degree-coefficient $EV_F$ map (ST208).

After calculating the vaporization-degree-coefficient $EV_F$, the vaporization-degree prediction section 75 of the processing section 72 acquires the fuel pressure P of the fuel that is detected by the fuel temperature sensor 25 (ST209). Subsequently, the vaporization-degree prediction section 75 calculates the vaporization-degree coefficient $EV_P$ from the acquired fuel pressure P and the vaporization-degree-coefficient $EV_P$ map (ST210).

After calculating the vaporization-degree-coefficient $EV_P$, the vaporization-degree prediction section 75 of the processing section 72 acquires the lift amount L of the fuel injection valves 21 (ST211). The lift amount L is determined from the injection amount of the fuel injected via the fuel injection valve 21 and the fuel pressure P. Accordingly, the vaporization-degree prediction section 75 acquires the fuel injection amount calculated from the various input signals and the fuel injection amount map, and calculates the lift amount L from this fuel injection amount and the acquired fuel pressure P. Subsequently, the vaporization-degree prediction section 75 calculates the vaporization-degree coefficient $EV_L$ from the obtained lift amount L and the vaporization-degree-coefficient $EV_L$ map (ST212).

Subsequently, the vaporization-degree prediction section 75 of the processing section 72 calculates the vaporization degree EV from the vaporization-degree coefficients $EV_P$, $EV_T$, $EV_F$, $EV_P$ and $EV_L$ (ST213). For example, the vaporization degree EV may be calculated by multiplying the vaporization-degree coefficients $EV_P$, $EV_T$, $EV_F$, $EV_P$ and $EV_L$ together, or by adding the vaporization-degree coefficients $EV_P$, $EV_T$, $EV_F$, $EV_P$ and $EV_L$.

Subsequently, the variable-exhaust-valve control section 74 of the processing section 72 calculates the variable-exhaust-valve opening timing from the calculated vaporization degree EV, and the variable-exhaust-valve opening timing map that is made based on the variable-exhaust-valve opening timing and the vaporization degree EV, which map is stored in the storage section 73, and is shown in FIG. 7 (ST214). As shown in FIG. 7, the variable-exhaust-valve opening timing map is set so that if the vaporization degree EV is smaller than a predetermined vaporization degree EV1, that is, if it is difficult for the fuel to vaporize, the opening timing of the variable exhaust valves 42 is retarded relative to the normal opening timing S2, which depends on the state in which the direct-injection internal combustion engine 1-2 is operating. In particular, the variable-exhaust-valve opening timing map is set so that the retard amount of the opening timing of the variable exhaust valves 42 increases in proportion to the decrease in the vaporization degree EV when the vaporization degree EV is smaller than the predetermined vaporization degree EV1. Accordingly, if the calculated vaporization degree EV is smaller than the predetermined vaporization degree EV1, the calculated variable-exhaust-valve opening timing S is retarded in comparison with the normal opening timing S2. The predetermined vaporization degree EV1 means a vaporization degree with which, if the vaporization degree is smaller than this vaporization degree, it is possible to determine that the vaporization of the fuel is insufficient, and, therefore, smoke will occur in the combustion chambers A.

Subsequently, the variable-exhaust-valve control section 74 of the processing section 72 performs the variable-exhaust-valve control, which is the control of the valve timing of the variable exhaust valves 42, based on the calculated variable-exhaust-valve opening timing S (ST215). In this embodiment, the variable-exhaust-valve control section 74 of the processing section 72 retards the opening timing of the variable exhaust valves 42 by supplying oil to the retard chamber of the variable-exhaust-valve timing mechanism 46, based on the retard amount that is the difference between the calculated variable-exhaust-valve opening timing S and the normal opening timing S2. Specifically, when the direct-injection internal combustion engine 1-2 operates in a cold-start state, and the fuel is injected during the compression stroke or the expansion stroke, the processing section 72 of the ECU 7 retards the opening timing of the variable exhaust valves 42 to delay the time when the combustion chamber A comes to communicate with the exhaust path 5.

If the opening timing of the variable exhaust valves 42 is retarded, the time during which the combustion chamber A is closed is increased. Thus, it is possible to vaporize the unvaporized fuel that is suspended in the combustion chamber A, even if the vaporization degree of the fuel is small. In addition, it is possible to elongate the time during which the fuel vaporized in this way is burned. In particular, in the second embodiment, while the engine is operating in a cold-start state, the retard amount of the opening timing of the variable exhaust valves 42 is increased in proportion to the decrease of the vaporization degree. In this way, the time during which the combustion chamber A is closed is controlled according to the vaporization degree that occurs in a cold-start state. Thus, the retard amount of the opening timing of the variable exhaust valves 42 is increased to elongate the time during which the combustion chamber A is closed when the temperature of the purification catalyst of the exhaust-gas purification device is low, in which case the air-fuel mixture in the combustion chambers A may be over-rich in terms of the air-fuel ratio. The retard amount of the opening timing of the variable exhaust valves 42 may also be increased when the vaporization degree is small, in which case a significant quantity of unvaporized fuel may remain suspended in the combustion chambers A. In this way, it is possible to vaporize the unvaporized fuel that is suspended in the combustion chambers A. In addition, by increasing the time during which the fuel vaporized in this way is burned, it is possible to inhibit the occurrence of smoke in the combustion chambers A.

The first and second embodiments may further include the step of determining the ignition timing of the ignition plugs 36 to control the variable exhaust valves. Specifically, the processing section 72 of the ECU 7 may determine whether the ignition timing of the ignition plugs 36 is retarded. If it is determined that the ignition timing is retarded, the processing section 72 performs the variable-exhaust-valve control, based on the calculated variable-exhaust-valve opening timing S shown in FIGS. 3 and 6.

When the direct-injection internal combustion engine 1-1 (1-2) is operating in a cold-start state, the temperature of the purification catalyst of the exhaust-gas purification device 61 is not yet at the activation temperature of the purification catalyst. Under such conditions, it is preferable to introduce high-temperature exhaust gas into the exhaust-gas purification device. Accordingly, when the engine is operating in a cold-start state, the ignition timing of the ignition plugs 36 is retarded to delay the ignition timing, to increase the temperature of the exhaust gas that is discharged into the exhaust path. However, when the ignition timing of the ignition plugs 36 is delayed, the time during which the fuel in the mixture is burned is reduced. In this case, much of the unvaporized fuel suspended in the combustion chambers A cannot be vaporized, and, therefore, the combustion is not continued. As a result, much smoke can occur in the combustion chambers A. However, by retarding the ignition timing of the ignition plugs 36 and the opening timing of the variable exhaust valves 42, it is possible to quickly increase the temperature of the purification catalyst of the exhaust-gas purification device 61 and to inhibit the occurrence of smoke in the combustion chambers A.

With regard to the above-described first and second embodiments, the retard amount of the opening timing of the variable exhaust valves 42 is controlled according to the coolant temperature T or the vaporization degree EV. However, the variable-exhaust-valve control may be performed so that the opening timing of the variable exhaust valves 42 is slightly retarded when it is determined that the coolant temperature T is lower than the predetermined coolant temperature T1, or when it is determined that the vaporization degree EV is smaller than the predetermined vaporization degree EV1.

The variable-exhaust-valve control of the first and second embodiments is performed only when the direct-injection internal combustion engine 1-1 (1-2) is operating in a cold-start state. In other words, this control is not performed when the direct-injection internal combustion engine 1-1 (1-2) is operating in a warm start state.

What is claimed is:

1. A direct-injection internal combustion engine, in which fuel injected into a combustion chamber during a compression stroke or an expansion stroke is mixed with intake air introduced into the combustion chamber to form an air-fuel mixture near an ignition plug, the engine comprising:
    a variable-exhaust-valve control device that controls the valve timing of a variable exhaust valve through which the combustion chamber of each engine cylinder communicates with an exhaust path, wherein the variable-exhaust-valve control device retards an opening timing of the variable exhaust valve when the fuel is injected during the compression stroke or the expansion stroke while the direct-injection internal combustion engine is operating in a cold-start state, wherein the variable-exhaust-valve control device controls a retard amount of the opening timing of the variable exhaust valve according to a vaporization degree of the injected fuel.

2. The direct-injection internal combustion engine according to claim 1, wherein
    the variable-exhaust-valve control device retards the opening timing of the variable exhaust valve relative to a normal opening timing, when the fuel is injected during the compression stroke or the expansion stroke while the direct-injection internal combustion engine is operating in a cold-start state.

3. The direct-injection internal combustion engine according to claim 2, wherein
    the variable-exhaust-valve control device retards the opening timing of the variable exhaust valve relative to the normal opening timing by a certain amount when the fuel is injected during the compression stroke or the expansion stroke while the direct-injection internal combustion engine is operating in a cold-start state.

4. A direct-injection internal combustion engine, in which fuel injected into a combustion chamber during a compression stroke or an expansion stroke is mixed with intake air introduced into the combustion chamber to form an air-fuel mixture near an ignition plug, the engine comprising:
    a variable-exhaust-valve control device that controls the valve timing of a variable exhaust valve through which the combustion chamber of each engine cylinder communicates with an exhaust path, wherein the variable-exhaust-valve control device retards an opening timing of the variable exhaust valve when the fuel is injected during the compression stroke or the expansion stroke while the direct-injection internal combustion engine is operating in a cold-start state; and
    a vaporization-degree prediction device that predicts a vaporization degree of the injected fuel,
    wherein the variable-exhaust-valve control device controls a retard amount of the opening timing of the variable exhaust valve according to the predicted vaporization degree.

5. The direct-injection internal combustion engine according to claim 4, wherein the variable-exhaust-valve control device retards the opening timing of the variable exhaust valve relative to the normal opening timing, according to the predicted vaporization degree.

6. The direct-injection internal combustion engine according to claim 4, wherein the variable-exhaust-valve control device increases the retard amount of the opening timing of the variable exhaust valve in proportion to the decrease of the predicted vaporization degree.

7. The direct-injection internal combustion engine according to claim 4, wherein the vaporization-degree prediction device predicts the vaporization degree of the fuel, based on at least one of a temperature in the combustion chamber, a temperature of the fuel to be injected via the fuel injection valve, and droplet diameter of the fuel injected via the fuel injection valve.

8. A direct-injection internal combustion engine, in which fuel injected into a combustion chamber during a compression stroke or an expansion stroke is mixed with intake air introduced into the combustion chamber to form an air-fuel mixture near an ignition plug, the engine comprising:
    a variable-exhaust-valve control device that controls the valve timing of a variable exhaust valve through which the combustion chamber of each engine cylinder communicates with an exhaust path, wherein the variable-exhaust-valve control device retards an opening timing of the variable exhaust valve when the fuel is injected during the compression stroke or the expansion stroke while the direct-injection internal combustion engine is operating in a cold-start state; and
    an ignition-timing control device that retards the ignition timing of the ignition plug when the fuel is injected during the compression stroke or the expansion stroke while the direct-injection internal combustion engine is operating in a cold-start state.

9. A method of controlling a direct-injection internal combustion engine, in which fuel injected into a combustion chamber during a compression stroke or an expansion stroke is mixed with intake air introduced into the combustion chamber to form a mixture near an ignition plug, the method comprising the step of:
    controlling valve timing of a variable exhaust valve through which the combustion chamber of an engine cylinder communicates with an exhaust path, wherein an opening timing of the variable exhaust valve is retarded when the fuel is injected during the compression stroke or the expansion stroke while the direct-injection internal combustion engine is operating in a cold-start state, wherein a retard amount of the opening timing of the variable exhaust valve is controlled according to a vaporization degree of the injected fuel.

10. The method of controlling a direct-injection internal combustion engine according to claim 9, wherein the opening timing of the variable exhaust valve is retarded relative to a normal opening timing, when the fuel is injected during the compression stroke or the expansion stroke while the direct-injection internal combustion engine is operating in a cold-start state.

11. The method of controlling a direct-injection internal combustion engine according to claim 10, wherein the opening timing of the variable exhaust valve is retarded relative to the normal opening timing by a certain amount when the fuel is injected during the compression stroke or the expansion stroke while the direct-injection internal combustion engine is operating in a cold-start state.

12. A method of controlling a direct-injection internal combustion engine, in which fuel injected into a combustion chamber during a compression stroke or an expansion stroke is mixed with intake air introduced into the combustion chamber to form a mixture near an ignition plug, the method comprising the steps of:
   controlling valve timing of a variable exhaust valve through which the combustion chamber of an engine cylinder communicates with an exhaust path, wherein an opening timing of the variable exhaust valve is retarded when the fuel is injected during the compression stroke or the expansion stroke while the direct-injection internal combustion engine is operating in a cold-start state; and
   predicting a vaporization degree of the fuel injected via the fuel injection valve, wherein a retard amount of the opening timing of the variable exhaust valve is controlled according to the predicted vaporization degree.

13. The method of controlling a direct-injection internal combustion engine according to claim 12, wherein the opening timing of the variable exhaust valve is retarded relative to the normal opening timing, according to the predicted vaporization degree.

14. The method of controlling a direct-injection internal combustion engine according to claim 12, wherein the retard amount of the opening timing of the variable exhaust valve is increased in proportion to the decrease in the predicted vaporization degree.

15. The method of controlling a direct-injection internal combustion engine according to claim 12, wherein the vaporization degree of the fuel is predicted based on at least one of a temperature in the combustion chamber, a temperature of the fuel to be injected via the fuel injection valve, and droplet diameter of the fuel injected via the fuel injection valve.

16. A method of controlling a direct-injection internal combustion engine, in which fuel injected into a combustion chamber during a compression stroke or an expansion stroke is mixed with intake air introduced into the combustion chamber to form a mixture near an ignition plug, the method comprising the steps of:
   controlling valve timing of a variable exhaust valve through which the combustion chamber of an engine cylinder communicates with an exhaust path, wherein an opening timing of the variable exhaust valve is retarded when the fuel is injected during the compression stroke or the expansion stroke while the direct-injection internal combustion engine is operating in a cold-start state; and
   controlling ignition timing of the ignition plug,
   wherein the ignition timing of the ignition plug is retarded when the fuel is injected during the compression stroke or the expansion stroke while the direct-injection internal combustion engine is operating in a cold-start state.

* * * * *